(12) United States Patent
Kesho

(10) Patent No.: US 9,766,516 B2
(45) Date of Patent: Sep. 19, 2017

(54) DISPLAY DEVICE

(71) Applicant: Japan Display Inc., Tokyo (JP)

(72) Inventor: Masato Kesho, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/182,944

(22) Filed: Jun. 15, 2016

(65) Prior Publication Data

US 2016/0370677 A1    Dec. 22, 2016

(30) Foreign Application Priority Data

Jun. 18, 2015 (JP) ................................. 2015-123309

(51) Int. Cl.
 *H01L 29/205*    (2006.01)
 *G02F 1/1345*    (2006.01)

(52) U.S. Cl.
 CPC ........ *G02F 1/1345* (2013.01); *G02F 1/13454* (2013.01); *G02F 2001/13456* (2013.01)

(58) Field of Classification Search
 CPC ............... G02F 1/1345; G02F 1/13454; G02F 2001/13456; H01L 33/38; G02B 27/026; G09G 3/04; G09G 2300/04; G09G 2300/0404; G09G 2300/0426; G09G 2300/0421; G09G 2300/043; G09G 2300/0439; G09G 2300/0456
 See application file for complete search history.

(56) References Cited

U.S. PATENT DOCUMENTS

2004/0189915 A1\* 9/2004 Taguchi ................ G02F 1/1345
                                                         349/139
2007/0030409 A1    2/2007 Aoki
2009/0174856 A1    7/2009 Aoki

FOREIGN PATENT DOCUMENTS

JP        2007-047259        2/2007

\* cited by examiner

*Primary Examiner* — Julio J Maldonado
*Assistant Examiner* — Stanetta Isaac
(74) *Attorney, Agent, or Firm* — K&L Gates LLP

(57) ABSTRACT

A display device includes a plurality of wiring lines that electrically couple a scanning line drive circuit arranged outside a first side of a display area to scanning lines. A first wiring line and a second wiring line adjacent thereto out of the wiring lines each include a linear portion and a coupling portion. The linear portion linearly extends in a direction away from the scanning line drive circuit. The coupling portion is formed continuously with the linear portion, curves to the second side of the display area from the direction in which the linear portion extends, and has a larger width than a width of the linear portion as the coupling portion becomes closer to the second side of the display area. A boundary of the coupling portion of the first piece of wiring facing the second piece of wiring is curved.

3 Claims, 12 Drawing Sheets

DISPLAY DEVICE

CROSS-REFERENCE TO RELATED APPLICATIONS

This application claims priority from Japanese Application No. 2015-123309, filed on Jun. 18, 2015, the contents of which are incorporated by reference herein in its entirety.

BACKGROUND

1. Technical Field

The present invention relates to a display device.

2. Description of the Related Art

Japanese Patent Application Laid-open Publication No. 2007-47259 (JP-A-2007-47259) discloses an electro-optic device in which at least one wiring line has a bent portion with its width gradually broadening as it extends from a first side to a second side of a substrate. As described in JP-A-2007-47259, the wider portion of the wiring line in the electro-optic device can reduce wiring resistance, thereby preventing crosstalk in a display area of the electro-optic device.

The electro-optic device described in JP-A-2007-47259, however, may possibly have increased capacitance at the wider portion of the wiring line, resulting in electrostatic discharge damage.

For the foregoing reasons, there is a need for a display device that can reduce wiring resistance while preventing electrostatic discharge damage.

SUMMARY

According to an aspect, a display device includes: a display area having a rectangular shape and including a plurality of pixels arranged in a matrix on a substrate; a plurality of scanning lines extending along respective rows in which the pixels are arranged; a scanning line drive circuit that sequentially supplies a scanning signal to the scanning lines; and a plurality of wiring lines that electrically couple a scanning line drive circuit arranged outside a first side of a display area to scanning lines. The wiring lines are arranged outside a second side orthogonal to the first side of the display area. A first wiring line and a second wiring line adjacent to the first wiring line out of the wiring lines each include a linear portion that linearly extends in a direction away from the scanning line drive circuit and a coupling portion that is formed continuously with the linear portion, that curves to the second side of the display area from the direction in which the linear portion extends, and that has a larger width than a width of the linear portion as the coupling portion becomes closer to the second side of the display area. A boundary of the coupling portion of the first wiring line facing the second wiring line is curved.

DETAILED DESCRIPTION

Figure 1:
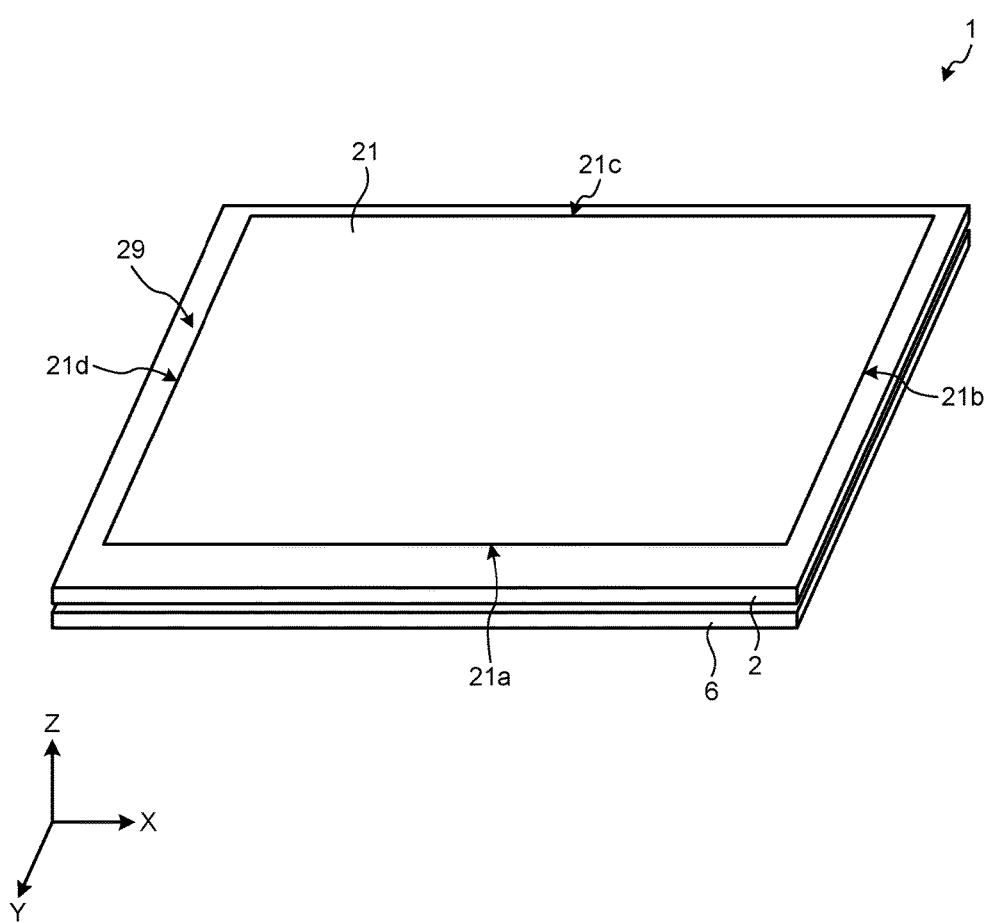
FIG. 1 is a diagram for explaining an example of a display device according to an embodiment of the present invention.

Exemplary aspects (embodiments) according to the present invention are described below in greater detail with reference to the accompanying drawings. The contents described in the embodiments are not intended to limit the present invention. Components described below include components easily conceivable by those skilled in the art and components substantially identical therewith. Furthermore, the components described below can be appropriately combined. The disclosure is given by way of example only, and various changes made without departing from the spirit of the invention and easily conceivable by those skilled in the art are naturally included in the scope of the invention. The drawings may possibly illustrate the width, the thickness, the shape, and the like of each unit more schematically than the actual aspect to simplify the explanation. These elements, however, are given by way of example only and are not intended to limit interpretation of the invention. In the specification and the figures, components similar to those previously described with reference to a preceding figure are denoted by like reference numerals, and detailed explanation thereof will be appropriately omitted.

First Embodiment

Figure 2:
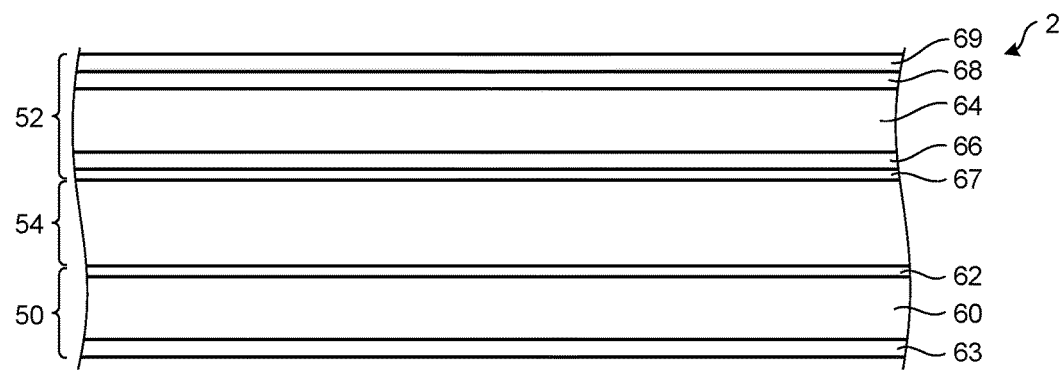
FIG. 2 is a sectional view of an example of a display unit.
Figure 3:
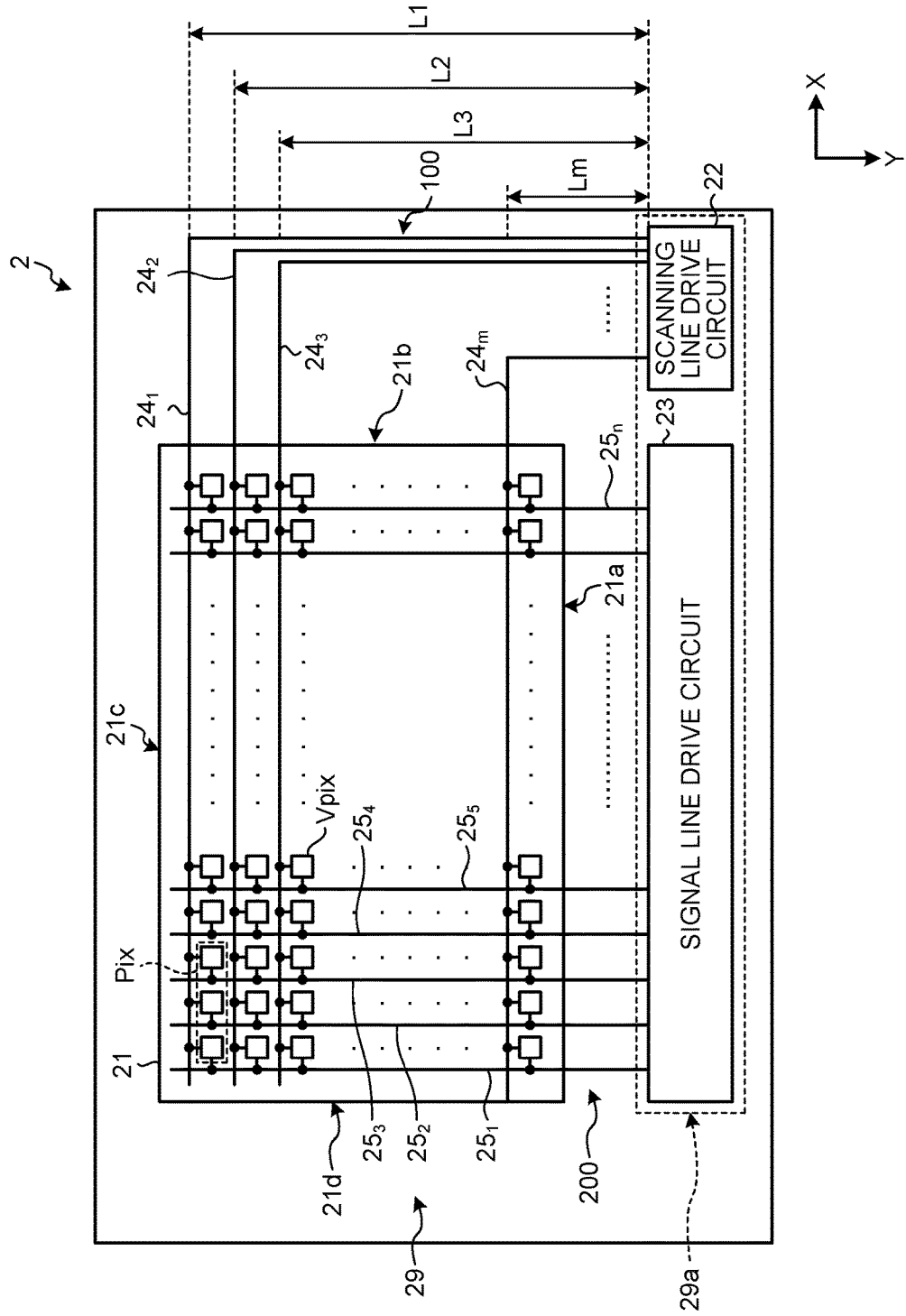
FIG. 3 is a block diagram of the display device illustrated in FIG. 1.
Figure 4:
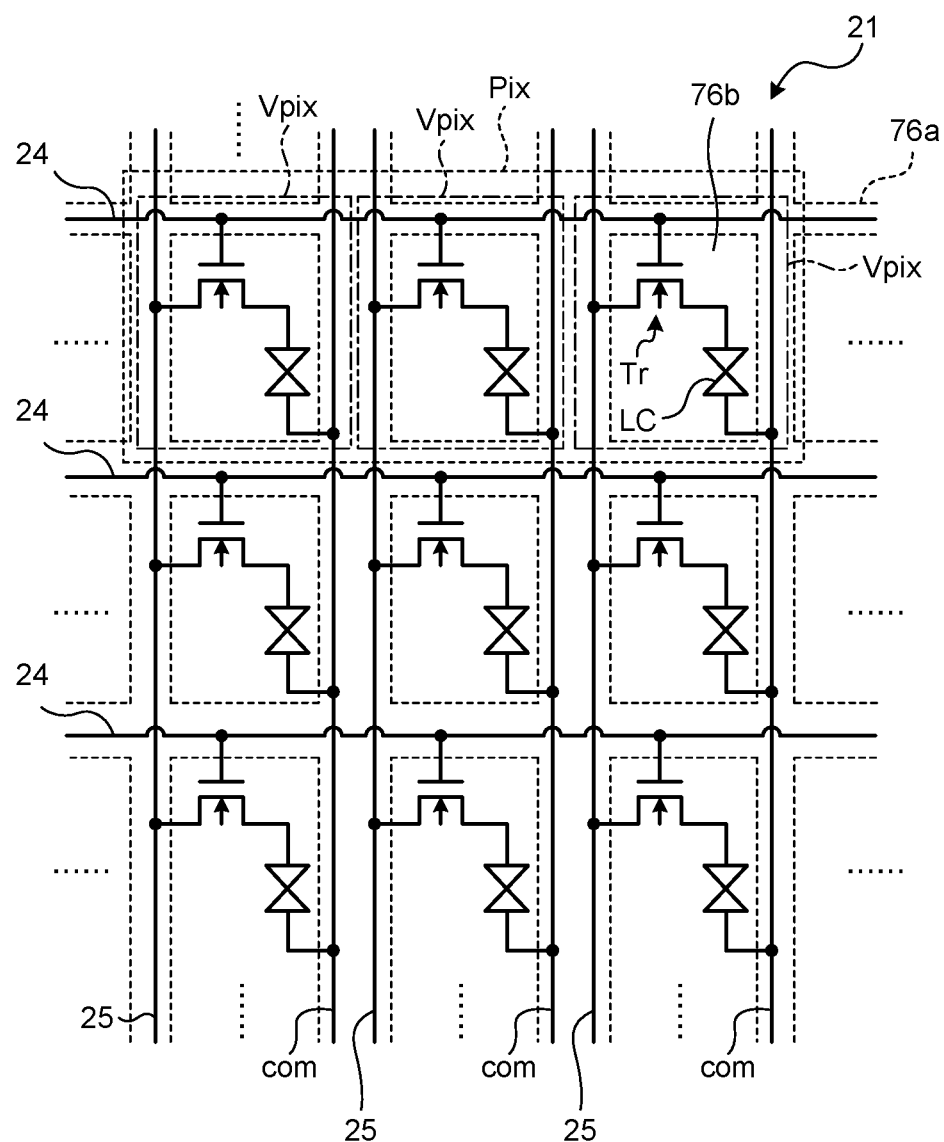
FIG. 4 is a circuit diagram of an example of pixel circuits.

FIG. 1 is a diagram for explaining an example of a display device according to an embodiment of the present invention. FIG. 2 is a sectional view of an example of a display unit. FIG. 3 is a block diagram of the display device illustrated in FIG. 1. FIG. 4 is a circuit diagram of an example of pixel circuits. FIG. 1 schematically illustrates the display device, and the size and the shape illustrated in FIG. 1 are not necessarily the same as those of the actual display device.

As illustrated in FIG. 1, a display device 1 includes a display unit 2 and a backlight 6. The display device 1 may be a transmissive or transflective display device or a reflective display device without the backlight 6.

The display unit 2 includes a display area 21 and a frame area 29 in planar view. The display area 21 displays an image, and the frame area 29 serves as a non-display area unable to display an image. The frame area 29 surrounds the display area 21. In the present embodiment, an X-direction represents a certain direction in the plane of the display unit 2, a Y-direction represents a direction orthogonal to the X-direction, and a Z-direction represents a direction orthogonal to the X-Y plane. The display area 21 has a rectangular shape and is surrounded by a first side 21a, a second side 21b, a third side 21c, and a fourth side 21d.

The backlight 6 is arranged on the back surface side of the display unit 2 (surface opposite to the surface for displaying an image viewed in the Z-direction). The backlight 6 outputs light to the display unit 2 and causes the light to be incident on the entire surface of the display area 21. The backlight 6 includes, for example, a light source and a light guide plate that guides light output from the light source to the back surface of the display unit 2. The backlight 6 may include a plurality of light sources arranged in the X-direction or the Y-direction and control the amounts of light from the light sources individually. With this configuration, the backlight 6 can cause light output from only a part of the light sources to be incident on a part of the display unit 2. While the display device 1 according to the present embodiment includes the backlight 6 arranged on the back surface side of the display unit 2 as the light source, it may include a front light arranged on the front surface side of the display unit 2.

FIG. 2 is a sectional view of an example of the display unit. As illustrated in FIG. 2, the display unit 2 includes a first substrate (upper substrate) 50, a second substrate (lower substrate) 52, and a liquid-crystal layer 54. The second substrate 52 is arranged facing one surface of the first substrate 50 in a perpendicular direction (Z-direction illustrated in FIG. 1). The liquid-crystal layer 54 is disposed between the first substrate 50 and the second substrate 52. The backlight 6 is arranged on the other surface side of the first substrate 50 opposite to the liquid-crystal layer 54 side.

The liquid-crystal layer 54 includes a number of scattered liquid crystals. The liquid crystals in the liquid-crystal layer 54 modulate light passing therethrough according to the state of an electric field and are driven in a horizontal electric field mode, such as a fringe field switching (FFS) mode or an in-plane switching (IPS) mode.

The first substrate 50 includes a pixel substrate 60, a first orientation film 62, and a first polarization plate 63. The pixel substrate 60 is a translucent substrate, such as glass. The first orientation film 62 is laminated on the pixel substrate 60 on the liquid-crystal layer 54 side. The first polarization plate 63 is laminated on the pixel substrate 60 on the side opposite to the liquid-crystal layer 54 side. The pixel substrate 60 will be described below. The first orientation film 62 orients the liquid-crystal molecules in the liquid-crystal layer 54 in a predetermined direction and is directly in contact with the liquid-crystal layer 54. The first orientation film 62 is made of a polymer material, such as polyimide, and is obtained by performing rubbing processing on applied polyimide or the like, for example. The first polarization plate 63 has a function to convert light made incident from the backlight 6 into linearly polarized light.

The second substrate 52 includes a counter substrate 64, a color filter 66, a second orientation film 67, a retardation plate 68, and a second polarization plate 69. The counter substrate 64 is a translucent substrate, such as glass. The color filter 66 is provided on the counter substrate 64 on the liquid-crystal layer 54 side. The second orientation film 67 is provided on the color filter 66 on the liquid-crystal layer 54 side. The retardation plate 68 is provided on the counter substrate 64 on the side opposite to the liquid-crystal layer 54 side. The second polarization plate 69 is provided on the retardation plate 68 on the side opposite to the counter substrate 64 side.

As illustrated in FIG. 3, the display area 21 has a number of pixels Vpix arranged in a matrix (rows and columns). A scanning line drive circuit 22 and a signal line drive circuit 23 are arranged in a frame area 29a outside of the first side 21a of the display area 21.

As illustrated in FIG. 3, the display area 21 has a matrix (row-and-column) structure in which the pixels Vpix including the liquid-crystal layer each serving as one pixel unit to be displayed are arranged in m rows×n columns. In the present specification, a row denotes a pixel row including m pixels Vpix arranged in a certain direction, whereas a column denotes a pixel column including n pixels Vpix arranged in a direction orthogonal to the direction in which the row extends. The values of m and n are determined depending on the display resolution in the vertical direction and that in the horizontal direction, respectively.

In the display area 21 having the array of m×n pixels Vpix, scanning lines $24_1, 24_2, 24_3, \ldots, 24_m$ are provided to the respective rows, and signal lines $25_1, 25_2, 25_3, 25_4, 25_5, \ldots, 25_n$ are provided to the respective columns. In the following description, the scanning lines $24_1, 24_2, 24_3, \ldots, 24_m$ according to the present embodiment may be collectively referred to as scanning lines 24, and the signal lines $25_1, 25_2, 25_3, 25_4, 25_5, \ldots, 25_n$ may be collectively referred to as signal lines 25.

In the display area 21, the scanning lines 24 and the signal lines 25 are arranged in an area overlapping with a black matrix 76a provided to the same layer as that of the color filter 66 (refer to FIG. 2) in planar view (viewed in the Z-direction). In the display area 21, areas not provided with the black matrix 76a serve as apertures 76b.

The color filter 66 illustrated in FIG. 2 has color areas colored with three colors, e.g., red (R), green (G), and blue (B). In the color filter 66, the color areas of R, G, and B, for example, are periodically arrayed on the respective apertures 76b illustrated in FIG. 4. The color areas R, G, and B are thus provided to the respective pixels Vpix, thereby constituting a pixel Pix as a set. The pixels Vpix may also be referred to as sub-pixels. The color filter 66 faces the liquid-crystal layer 54 in a direction perpendicular to the pixel substrate 60. A combination of other colors may be employed for the color filter 66 as long as it is colored with different colors. In the color filter 66, the black matrix 76a may be provided to cover the outer periphery of the pixels Vpix illustrated in FIG. 3. The black matrix 76a is arranged at boundaries between the pixels Vpix that are two-dimensionally arranged, thereby having a grid shape. The black matrix 76a is made of a material having high light absorbance than that of the color filter 66.

As illustrated in FIG. 2, similarly to the first orientation film 62, the second orientation film 67 orients the liquid-crystal molecules in the liquid-crystal layer 54 in a predetermined direction and is directly in contact with the liquid-crystal layer 54. The second orientation film 67 is made of a polymer material, such as polyimide, and obtained by performing rubbing processing on applied polyimide or the like, for example. The retardation plate 68 has a function to compensate variation of a viewing angle due to the first polarization plate 63 and the second polarization plate 69. The second polarization plate 69 has a function to absorb linear polarization components parallel to a polarization plate absorption axis and transmit polarization components orthogonal thereto. The second polarization plate 69 has a function to transmit or block light depending on the ON/OFF state of the liquid crystals.

The scanning line drive circuit 22 illustrated in FIG. 3 sequentially outputs, as a scanning signal, digital data of one line supplied from the outside. The scanning line drive circuit 22 supplies the scanning signal to the scanning lines $24_1$, $24_2$, $24_3$, ..., $24_m$ in the display area 21, thereby sequentially scanning the pixels Vpix row by row. The scanning line drive circuit 22 sequentially outputs the digital data to the scanning lines 24 from the upper side to the lower side in the vertical scanning direction, i.e., from the scanning line $24_1$ to the scanning line $24_m$ (in the Y-direction), for example. Alternatively, the scanning line drive circuit 22 may sequentially output the digital data from the lower side to the upper side in the vertical scanning direction.

The signal line drive circuit 23 is supplied with 6-bit digital video data of R, G, and B, for example. The signal line drive circuit 23 writes display data, via the signal lines 25, to the pixels Vpix in the row that is scanned in the vertical scanning by the scanning line drive circuit 22 in units of a pixel, a plurality of sub-pixels, or all the sub-pixels.

On the pixel substrate 60 illustrated in FIG. 2, a number of pixel circuits each including an active element (e.g., a thin film transistor) are arranged in a matrix in planar view. The display area 21 is provided with wiring, such as the signal lines 25 and the scanning lines 24. The signal lines 25 supply pixel signals as display data to thin film transistors (TFTs) Tr in the respective pixels Vpix illustrated in FIG. 4. The scanning lines 24 drive the thin film transistors Tr. The signal lines 25 extend on a plane parallel to the surface of the pixel substrate 60 and supply, to the pixels Vpix, the pixel signals to display an image. The pixels Vpix each include the thin film transistor Tr and a liquid-crystal capacitor LC. The thin film transistor Tr is an n-channel metal oxide semiconductor (MOS) TFT in this example. One of the source and the drain of the thin film transistor Tr is coupled to the signal line 25, the gate thereof is coupled to the scanning line 24, and the other of the source and the drain thereof is coupled to one end of the liquid-crystal capacitor LC. The one end of the liquid-crystal capacitor LC is coupled to the thin film transistor Tr, and the other end thereof is coupled to a common electrode com. As described above, the display area 21 is supplied with common potentials Vcom that are supplied commonly to the pixel electrodes of the respective pixels Vpix.

The pixel Vpix is coupled to other pixels Vpix belonging to the same row in the display area 21 by the corresponding one of the scanning lines 24. The scanning lines 24 extend along the respective rows in which the pixels Pix or the pixels Vpix are arranged. The scanning lines 24 are coupled to the scanning line drive circuit 22 and are supplied with scanning signals from the scanning line drive circuit 22. The pixel Vpix is coupled to other pixels Vpix belonging to the same column in the display area 21 by the corresponding one of the signal lines 25. The signal lines 25 are coupled to the signal line drive circuit 23 and are supplied with pixel signals from the signal line drive circuit 23. The common electrodes com are coupled to a drive electrode driver, which is not illustrated, and supplied with voltages from the drive electrode driver. The pixel Vpix is also coupled to the other pixels Vpix belonging to the same column in the display area 21 by the common electrodes com.

Figure 5:
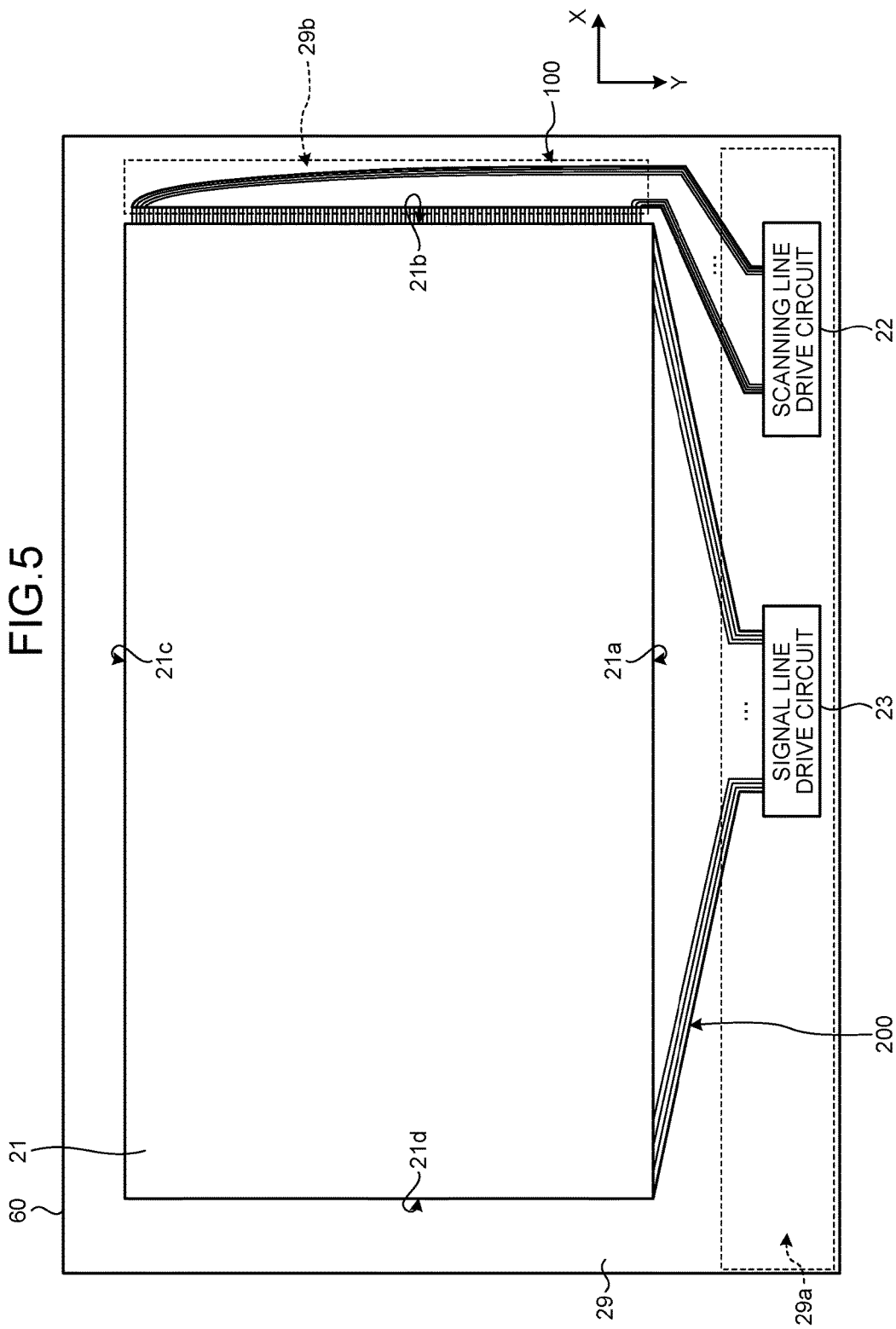
FIG. 5 is a plan view schematically illustrating a plurality of wiring lines that electrically couple a scanning line drive circuit and scanning lines.

FIG. 5 is a plan view schematically illustrating a plurality of wiring lines that electrically couple the scanning line drive circuit and the scanning lines. The scanning line drive circuit 22 and the signal line drive circuit 23 are integrated circuits called chip on glass (COG). While the scanning line drive circuit 22 and the signal line drive circuit 23 according to the present embodiment are provided as two integrated circuits, they may be provided as one integrated circuit. Alternatively, the scanning line drive circuit 22, the signal line drive circuit 23, and the drive electrode driver described above may be provided as one integrated circuit.

The scanning line drive circuit 22 applies scanning signals to the gates of the thin film transistors Tr of the pixels Vpix via a plurality wiring lines 100 and the scanning lines 24 (scanning lines $24_1$, $24_2$, $24_3$, ..., $24_m$) illustrated in FIGS. 3 and 5. As a result, the pixels Vpix belonging to a row (a horizontal line) out of the pixels Vpix in the display area 21 is sequentially selected as a target of display drive.

The signal line drive circuit 23 supplies pixel signals to the respective pixels Vpix of one horizontal line sequentially selected by the scanning line drive circuit 22 via a plurality wiring lines 200 and the signal lines 25 (signal lines $25_1$, $25_2$, $25_3$, $25_4$, $25_5$, ..., $25_n$) illustrated in FIGS. 3 and 5. The pixels Vpix perform display of the one horizontal line based on the supplied pixel signals.

As illustrated in FIG. 5, the wiring lines 100 are arranged in a frame area 29b outside of the second side 21b of the display area 21 orthogonal to the first side 21a of the display area 21. The wiring lines 100 electrically couple the scanning line drive circuit 22 and the respective scanning lines 24. The wiring lines 100, for example, are conductive patterns made of an electric conductor, such as aluminum (Al) or an aluminum alloy. Alternatively, the wiring lines 100 may be conductive patterns made of an electric conductor obtained by laminating two or more types of conductive metals, such as Al, titanium (Ti), and molybdenum (Mo).

The number of the wiring lines 100 is the same as that of the scanning lines 24. An increase in the resolution of the display area 21 increases the number of the scanning lines 24 and thus increases the number of the wiring lines 100. An increase in the resolution of the display area 21 decreases the width of the wiring lines 100 in the X-direction arranged in the limited frame area 29b.

Figure 6:
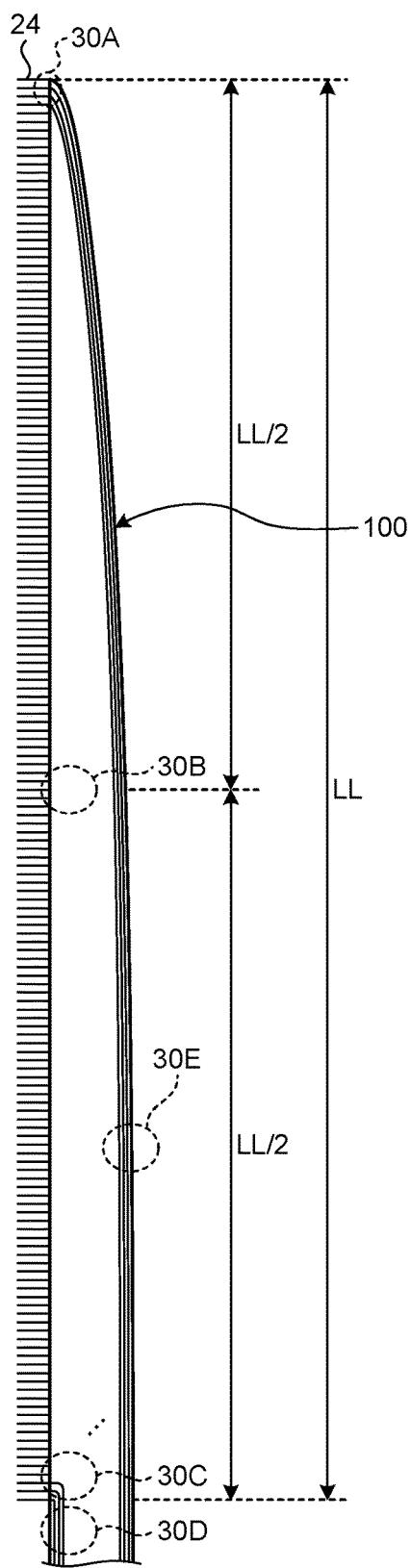
FIG. 6 is an enlarged schematic of the wiring lines illustrated in FIG. 5.
Figure 7:
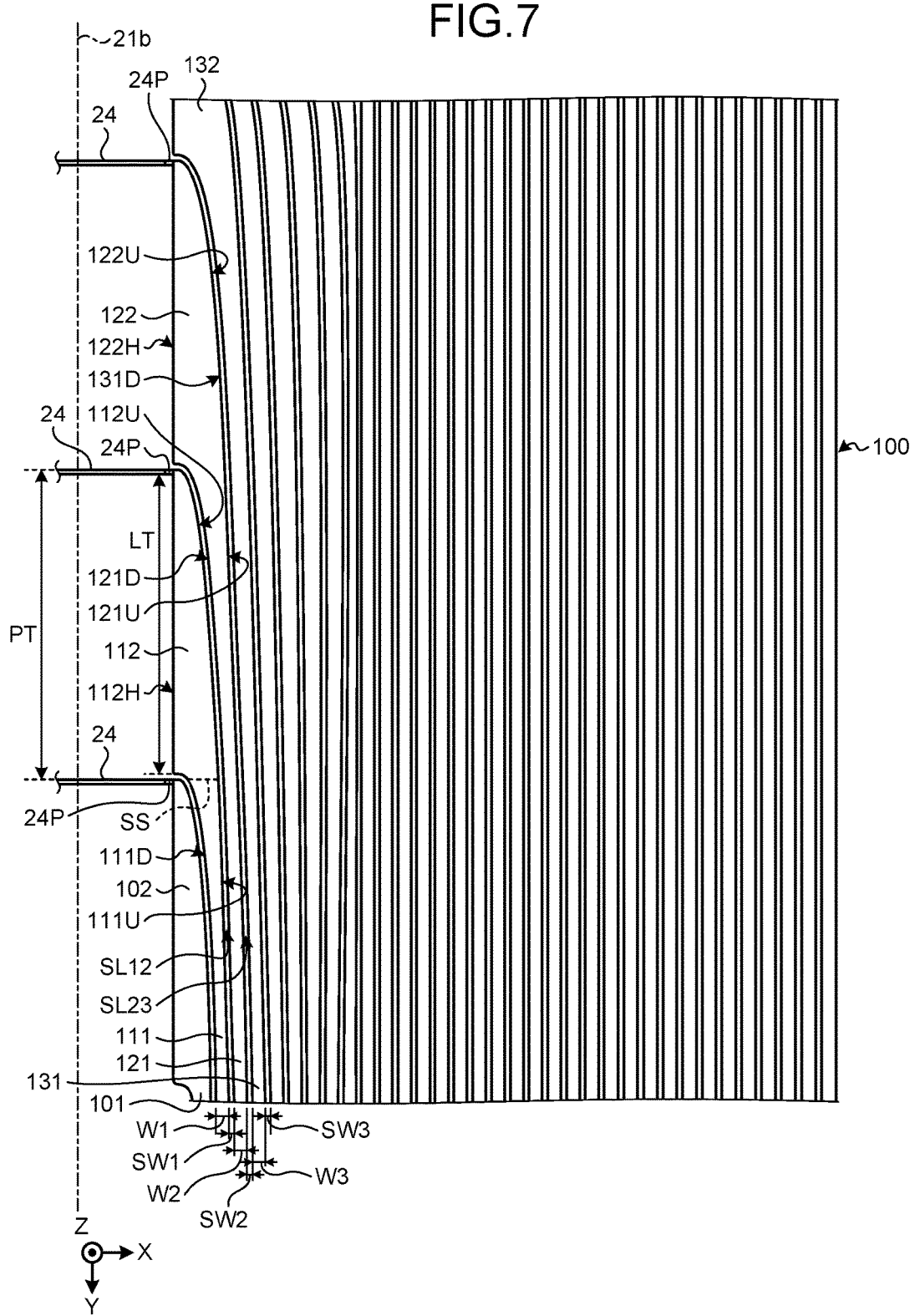
FIG. 7 is an enlarged schematic of a part of the wiring lines illustrated in FIG. 6 closer to the scanning lines.
Figure 8:
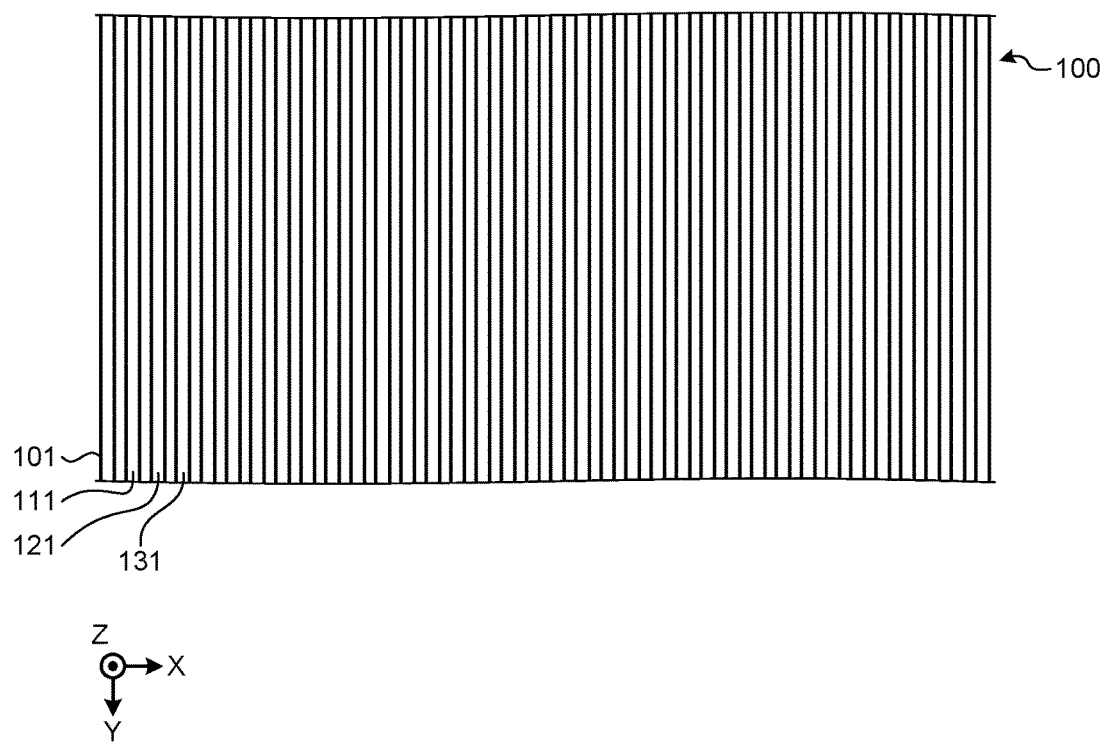
FIG. 8 is an enlarged schematic of a part of the wiring lines illustrated in FIG. 6 arranged closer to the scanning line drive circuit.

FIG. 6 is an enlarged schematic of the wiring lines illustrated in FIG. 5. FIG. 7 is an enlarged schematic of a part of the wiring lines illustrated in FIG. 6 arranged closer to the scanning lines. FIG. 8 is an enlarged schematic of a part of the wiring lines illustrated in FIG. 6 arranged closer to the scanning line drive circuit. As illustrated in FIG. 5, the wiring lines 100 extend in a direction away from the scanning line drive circuit 22. The wiring lines are arranged in the X-direction. As illustrated in FIG. 6, the wiring lines 100 are coupled to the respective scanning lines 24 arranged in the Y-direction. With this structure, the number of the wiring lines 100 in the X-direction decreases as they extend away from the scanning line drive circuit 22 (refer to FIG. 5).

In FIG. 6, an area 30A at which the wiring lines 100 are coupled to the scanning lines 24 is arranged the farthest from the scanning line drive circuit 22 (refer to FIG. 5). In FIG. 6, an area 30C at which the wiring lines 100 are coupled to the scanning lines 24 is arranged the closest to the scanning line drive circuit 22 (refer to FIG. 5). Assuming that LL is a distance between the scanning line arranged the farthest from the scanning line drive circuit 22 (refer to FIG. 5) and the scanning line arranged the closest to the scanning line drive circuit 22, an area 30B is positioned away from the farthest and the closest scanning lines by an intermediate distance LL/2 of the distance LL.

In FIG. 6, an area 30D is positioned where the wiring lines 100 are yet to be coupled to the scanning lines 24. In other words, the area 30D is closer to the scanning line drive circuit 22 (refer to FIG. 5) than the area 30C. An area 30E illustrated in FIG. 6 includes the wiring lines 100 arranged the farthest in the X-direction from the second side 21*b* (refer to FIG. 5) of the display area 21.

The wiring lines illustrated in FIG. 7 according to the first embodiment are arranged in the area 30C. The wiring lines illustrated in FIG. 8 are arranged in the area 30D illustrated in FIG. 6. Because wiring lines similar to those illustrated in FIG. 7 are arranged in the area 30B, detailed explanation of the area 30B will be omitted in the following description. The wiring lines illustrated in FIG. 10 according to a second embodiment of the present invention, which will be described below, are arranged in the area 30E illustrated in FIG. 6. The wiring lines illustrated in FIG. 11 according to the second embodiment, which will be described below, are arranged in the area 30A illustrated in FIG. 6.

As illustrated in FIG. 8, the wiring lines 100 extend in the Y-direction and are arranged at regular intervals in the X-direction. In FIG. 8, four adjacent wiring lines are representatively illustrated out of the wiring lines 100. These wiring lines include a linear portion 101, a linear portion 111, a linear portion 121, and a linear portion 131.

In FIG. 7, four adjacent wiring lines are representatively illustrated out of the wiring lines 100. These pieces of wiring include a coupling portion 102, a coupling portion 112, a coupling portion 122, and a coupling portion 132 formed continuously with the linear portions 101, 111, 121, and 131, respectively, illustrated in FIG. 8.

As illustrated in FIG. 7, the coupling portions 102, 112, 122, and 132 curves to the second side 21*b* of the display area 21 from the direction in which the linear portions 101, 111, 121, and 131, respectively, extend.

The coupling portions 102, 112, 122, and 132 are coupled to the respective scanning lines 24 via a conductive terminal 24P having a through-hole or the like.

Because the linear portion 111 and the coupling portion 112 are formed continuously and made of a single electric conductor, a boundary 111U of the linear portion 111 is continuous with a boundary 112U of the coupling portion 112. Similarly, a boundary 112H of the coupling portion 112 is continuous with a boundary 111D of the linear portion 111. The intersection of the boundary 111D of the linear portion 111 and the boundary 112H of the coupling portion 112 is formed into a curve not to have a corner. The boundary 112U of the coupling portion 112 faces a boundary 121D of the linear portion 111 of the adjacent wiring line and has a curved shape. The curve may be any type of curve as long as it has no corner. In other words, the boundary 112U of the coupling portion 112 has an arc shape. The arc of the boundary 112U of the coupling portion 112, for example, is an elliptic arc coinciding with a part of an ellipse. The boundary 121D also has an arc shape.

The coupling portion 112 is a conductive pattern surrounded by a virtual line SS, the boundary 112U, and the boundary 112H. The virtual line SS is obtained by extending, in the X-direction, the scanning line 24 adjacent in the Y-direction to the scanning line 24 to be coupled to the coupling portion 112.

Similarly, because the linear portion 121 and the coupling portion 122 are continuously formed and made of a single electric conductor, a boundary 121U of the linear portion 121 is continuous with a boundary 122U of the coupling portion 122. A boundary 122H of the coupling portion 122 is continuous with the boundary 121D of the linear portion 121. The intersection of the boundary 121D of the linear portion 121 and the boundary 122H of the coupling portion 122 is formed into a curve not to have a corner. The boundary 122U of the coupling portion 122 faces a boundary 131D of the linear portion 131 of the adjacent wiring line and has a curved shape. The curve may be any type of curve as long as it has no corner. In other words, the boundary 122U has an arc shape. The arc of the boundary 122U of the coupling portion 122, for example, is an elliptic arc coinciding with a part of an ellipse. The boundary 131D also has an arc shape.

The curve formed by the boundary 112U of the coupling portion 112 preferably has the same arc shape as that of the curve formed by the boundary 122U of the coupling portion 122. The arc formed by the boundary 112U, for example, coincides with the same ellipse as that with which the arc formed by the boundary 122U coincides. This structure eliminates deviation in the density of spaces between the wiring lines, thereby enabling stable etching. While the coupling portions 112 and 122 have been described, the coupling portions 102 and 132 also have the same structure.

As illustrated in FIG. 7, a width LT of the coupling portions 112, 122, and 132 in the Y-direction is larger than widths W1, W2, and W3 of the linear portions 111, 121, and 131, respectively, in the X-direction. The width LT of the coupling portions 102, 112, 122, and 132 in the Y-direction is smaller than a pitch distance PT between adjacent scanning lines 24.

Between adjacent wiring lines, a slit SL12 without electric conductor provides electrical insulation between the linear portions 111 and 121 and between the coupling portions 112 and 122. A width SW1 of the slit SL12 is constant between the linear portions 111 and 121 and between the coupling portions 112 and 122.

Between adjacent wiring lines, a slit SL23 having no electric conductor provides electrical insulation between the linear portions 121 and 131 and between the coupling portions 122 and 132. A width SW2 of the slit SL23 is constant between the linear portions 121 and 131 and between the coupling portions 122 and 132. The width SW3 is equal to the width SW2.

As described above, the slits between adjacent wiring lines are configured to have the same width and a shape without corner like the slits SL12 and SL23. This configuration can ensure the maximum area for the conductive patterns of the wiring lines 100 each serving as an electric conductor.

The following describes the wiring lines 100 that couple the scanning line drive circuit 22 to the scanning lines $24_1$, $24_2$, $24_3$, ... and $24_m$ illustrated in FIG. 3. The scanning lines 24 are arranged so as to get closer to the scanning line drive circuit 22 in order of the scanning lines $24_1$, $24_2$, $24_3$, ... and $24_m$. Assuming distances of the wiring lines 100 that couple the scanning line drive circuit 22 to the scanning lines $24_1$, $24_2$, $24_3$, ... and $24_m$, are distances L1, L2, L3, ... and Lm, respectively, the distance increases in order of the distances Lm, ... L3, L2, and L1. If the widths of the scanning lines $24_1$, $24_2$, $24_3$, ... and $24_m$ in the X-direction are the same, resistance difference occurs in the wiring lines 100 depending on the difference among the distances Lm, ... L3, L2, and L1. When the wiring lines 100 have large resistance difference, if pulses of the same scanning signal are transmitted from the scanning line drive circuit 22 to the scanning lines $24_1$, $24_2$, $24_3$, ... and $24_m$, difference in time constant is caused in the pulses of the transmitted scanning signal. The difference may possibly affect the display quality of the display area 21.

To reduce the resistance difference among the wiring lines 100 in the display device according to the first embodiment, the width W1, W2, and W3 in the X-direction illustrated in FIG. 7 are gradually increased in the X-direction when viewed from the same position in the Y-direction.

To further reduce the resistance in the wiring lines according to the first embodiment, the widths of the coupling portions 102, 112, 122, and 132 are larger than the widths of the linear portions 101, 111, 121, and 131, respectively. This configuration increases the parasitic capacitance of the coupling portions 102, 112, 122, and 132, thereby making electrostatic discharge damage more likely to occur between adjacent wiring lines 100.

Assuming that one of the wiring lines 100 is a first wiring line in the display device according to the first embodiment, the first wiring line, for example, has the linear portion 111 and the coupling portion 112. A second wiring line adjacent to the first wiring line has the linear portion 121 and the coupling portion 122. The boundary 112U of the coupling portion 112 of the first wiring line that faces the second wiring line has a curved shape. This structure has no corner at the boundary 112U, thereby suppressing transmission of static electricity between the coupling portion 112 of the first wiring line and the second wiring line.

The boundary 112U of the coupling portion 112 has an arc shape, and the boundary 121D of the second wiring line facing the boundary 112U of the coupling portion 112 also has an arc shape. With the slit SL12 that insulates the first wiring line from the second wiring line, a part of the boundary 121D of the second wiring line also has a curved shape. This structure further suppresses transmission of static electricity between the coupling portion 112 of the first wiring line and the second wiring line. The explanation has been representatively made about the structure in which the first wiring line has the linear portion 111 and the coupling portion 112. The first wiring line, however, may be any one of the wiring lines 100 other than the wiring line 100 arranged the farthest from the second side 21b of the display area 21 (refer to FIG. 5) in the X-direction.

Second Embodiment

Figure 9:
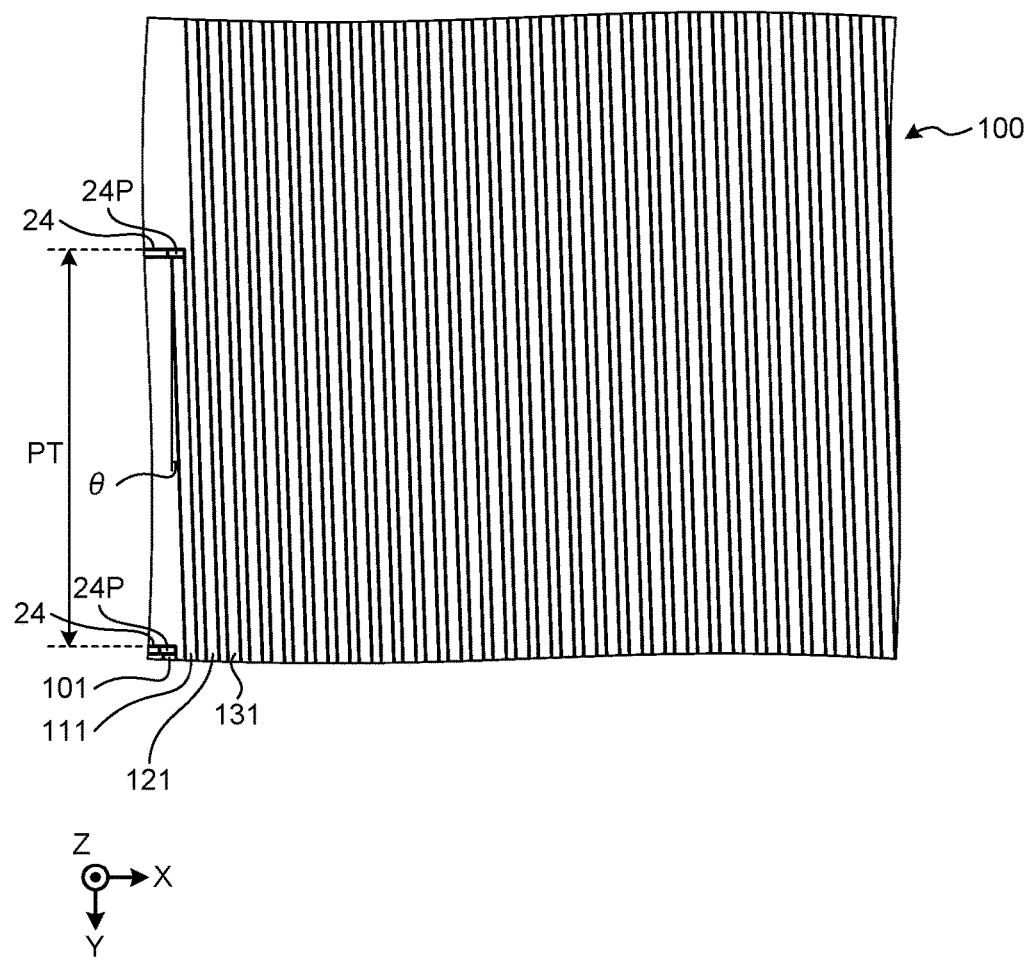
FIG. 9 is another enlarged schematic of a part of the wiring lines illustrated in FIG. 6 arranged closer to the scanning lines.
Figure 10:
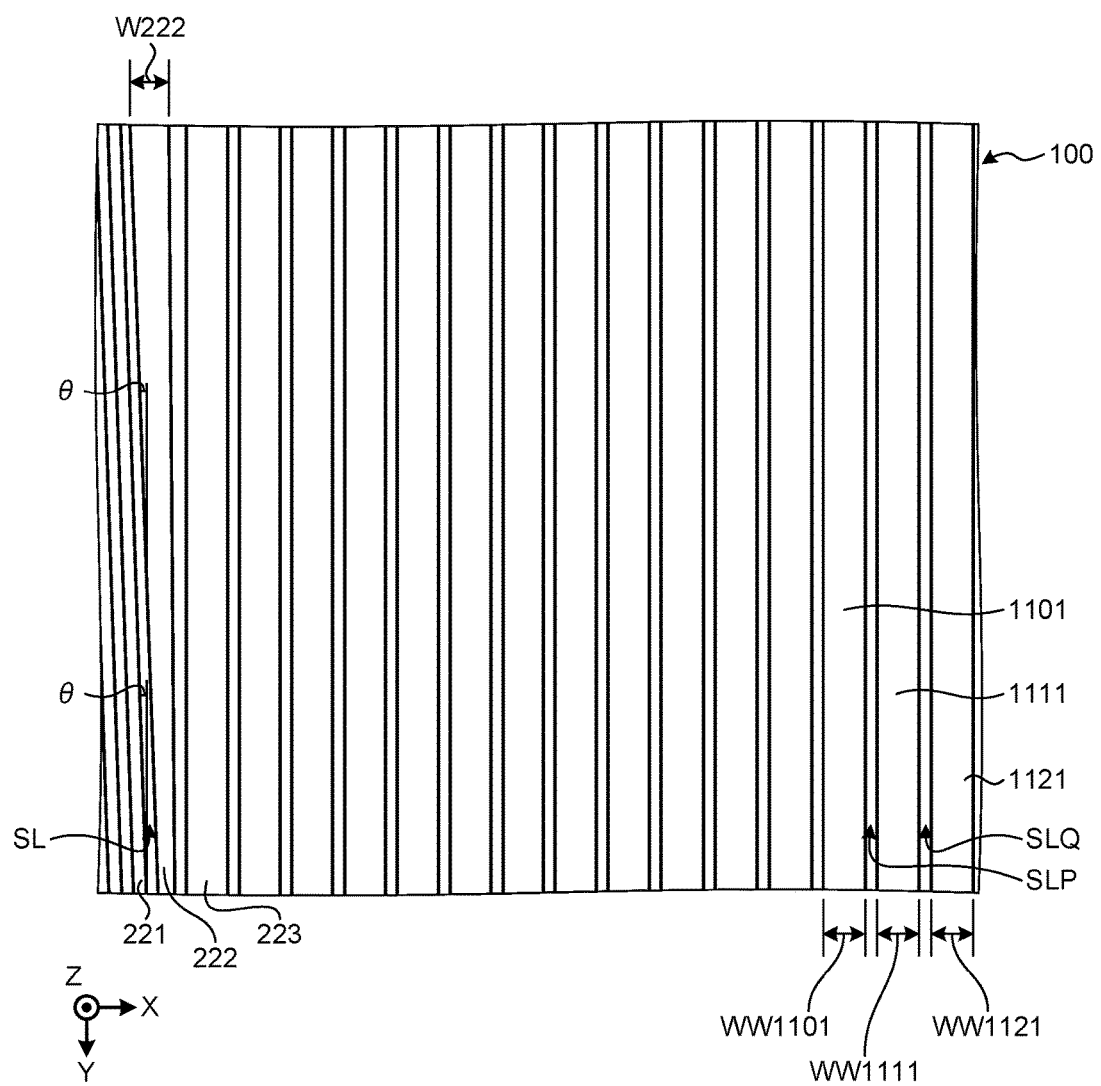
FIG. 10 is an enlarged schematic of a part of the wiring lines illustrated in FIG. 6 arranged the farthest from a second side of a display area.
Figure 11:
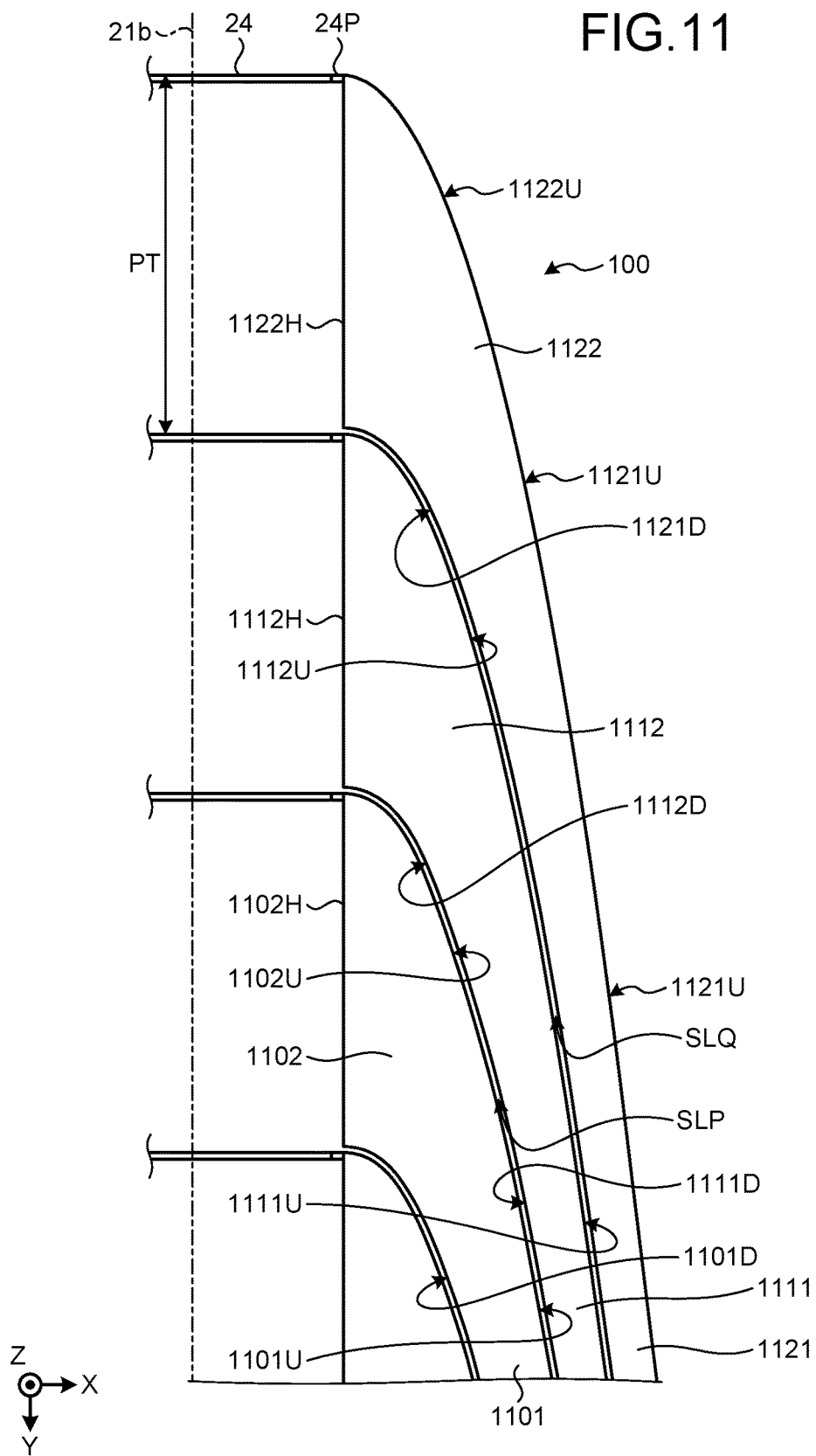
FIG. 11 is still another enlarged schematic of a part of the wiring lines illustrated in FIG. 6 arranged closer to the scanning lines.

FIGS. 9 and 11 are enlarged schematics of a part of the wiring lines illustrated in FIG. 6 arranged closer to the scanning lines. FIG. 10 is an enlarged schematic of a part of the wiring lines illustrated in FIG. 6 arranged the farthest from the second side of the display area. Components identical with those described in the first embodiment are denoted by like reference numerals, and overlapping explanation thereof will be omitted.

The wiring lines illustrated in FIG. 9 according to a second embodiment of the present invention are arranged in the area 30C illustrated in FIG. 6. The wiring lines illustrated in FIG. 8 are arranged in the area 30D illustrated in FIG. 6. The wiring lines illustrated in FIG. 10 are arranged in the area 30E illustrated in FIG. 6. The wiring lines illustrated in FIG. 11 are arranged in the area 30A illustrated in FIG. 6. Because wiring lines similar to those illustrated in FIG. 7 are arranged in the area 30B, detailed explanation of the area 30B will be omitted.

As illustrated in FIG. 9, the linear portions 101, 111, 121, and 131 illustrated in FIG. 8 continuously extend. In FIG. 9, the linear portion 101 is directly coupled to one of the scanning lines 24 via the conductive terminal 24P having a through-hole or the like. Similarly, the linear portion 111 is directly coupled to one of the scanning lines 24 via the conductive terminal 24P having a through-hole or the like.

Directly coupling the linear portion 101 to one of the scanning lines 24 decreases the number of the wiring lines 100 in the X-direction. As a result, a space is formed between adjacent terminals 24P. The linear portion 111 extends in a direction away from the scanning line drive circuit 22 (refer to FIG. 5) such that the linear portion 111 is inclined by an angle θ with respect to the Y-direction so as to fill the space. The linear portions 121 and 131 aligned with the linear portion 111 are also inclined by the angle θ with respect to the Y-direction.

As illustrated in FIG. 10, coupling the linear portion 101 (refer to FIG. 9) arranged the closest to the second side 21b to one of the scanning lines 24 increases a width of a linear portion 1121 of the wiring line arranged the farthest from the linear portion 101 in the X-direction, and this width is denoted by a width WW1121. Coupling the linear portion 111 (refer to FIG. 9) arranged closer to the second side 21b to one of the scanning lines 24 increases a width of a linear portion 1111 arranged closer to the second side 21b (refer to FIG. 6), i.e., on the inner side than the linear portion 1121, and this width is denoted by a width WW1111. Similarly, coupling the linear portion 121 (refer to FIG. 9) arranged closer to the second side 21b to one of the scanning lines 24 increases a width of a linear portion 1101 on the inner side than the linear portion 1111, and this width is denoted by a width WW1101. The widths WW1121, WW1111, and WW1101 according to the second embodiment are the same width.

As described above, each time one linear portion arranged the closest to the second side 21b is coupled to the one of the scanning lines 24, the number of the linear portions having a width that becomes larger is increased. The following describes this configuration using linear portions 221, 222, and 223 that are arranged in this order in the X-direction illustrated in FIG. 10. The linear portion 222 has a larger width in the X-direction. The linear portion 221 is inclined by the angle θ with respect to the Y-direction along the linear portion arranged the closest to the second side 21b. While a first boundary of the linear portion 222 facing the linear portion 221 is inclined by the angle θ with respect to the Y-direction, a second boundary of the linear portion 222 is parallel to the Y-direction. The slit SL that insulates the linear portion 221 from the linear portion 222 has a constant width. As the linear portion 222 extends in a direction away from the scanning line drive circuit 22, the width thereof gradually increases by the angle θ. The width of the linear portion 222 in the X-direction increases to a width W222 that is equal to the widths WW1121, WW1111, and WW1101.

The display device according to the second embodiment includes a third wiring line. The third wiring line has a linear portion linearly extending in a direction away from the scanning line drive circuit 22 and directly coupled to one of the scanning lines 24. Each time the linear portion of the third wiring line is coupled to one of the scanning lines 24, the number of the linear portions having a larger width is increased from the farthest side from the second side 21b of the display area 21. With this structure, adjacent wiring lines are more like to have the same width. As a result, difference in the parasitic capacitance is reduced between adjacent wiring lines, thereby making electrostatic discharge damage less likely to occur.

Assume that half of the wiring lines are the third wiring lines having their linear portions directly coupled to the respective scanning lines 24, and the other wiring lines are coupled to the respective scanning lines 24 via the coupling portions described above. In this case, the third wiring lines having their linear portions directly coupled to the respective scanning lines 24 are arranged within a range of the intermediate distance LL/2 from the area 30D to the area 30B. In this structure, the other wiring lines are coupled to the respective scanning lines 24 via the coupling portions similar to the coupling portions 102, 112, 122, and 132 illustrated in FIG. 7 from the area 30B to the area 30A arranged the farthest from the scanning line drive circuit 22 (refer to FIG. 5).

In the display device according to the second embodiment, increase in the number of the linear portions having a larger width from the farthest side from the second side 21b of the display area 21 allows the resistance difference among the wiring lines 100 to be reduced. The display device of the present embodiment also includes coupling portions similar to the coupling portions 102, 112, 122, and 132 from the area 30B to the scanning line arranged the farthest from the scanning line drive circuit 22 (refer to FIG. 5), thereby reducing the resistance difference among the wiring lines 100.

By making the area of the coupling portions in the area 30A larger than that of the coupling portions in the area 30B, the resistance difference among the wiring lines 100 can be further reduced.

As illustrated in FIG. 11, coupling portions 1102, 1112, and 1122 curves to the second side 21b of the display area 21 from the direction in which the linear portions 1101, 1111, 1121, respectively, extend.

The coupling portions 1102, 1112, and 1122 are coupled to the respective scanning lines 24 via the conductive terminal 24P having a through-hole or the like.

Because the linear portion 1101 and the coupling portion 1102 are formed continuously and made of a single electric conductor, a boundary 1101U of the linear portion 1101 is continuous with a boundary 1102U of the coupling portion 1102. Similarly, a boundary 1102H of the coupling portion 1102 is continuous with a boundary 1101D of the linear portion 1101. The boundary 1102U of the coupling portion 1102 faces a boundary 1112D of the coupling portion 1112 of the adjacent wiring line and has a curved shape. The curve may be any type of curve as long as it has no corner. In other words, the boundary 1102U of the coupling portion 1102 has an arc shape obtained by connecting curves. The arc of the boundary 1102U of the coupling portion 1102, for example, is an elliptic arc coinciding with a part of an ellipse. The boundary 1112D also has an arc shape.

Similarly, because the linear portion 1111 and the coupling portion 1112 are formed continuously and made of a single electric conductor, a boundary 1111U of the linear portion 1111 is continuous with a boundary 1112U of the coupling portion 1112. A boundary 1112H of the coupling portion 1112 is continuous with a boundary 1111D of the linear portion 1111. The boundary 1112U of the coupling portion 1112 faces a boundary 1121D of the linear portion 1121 of the adjacent wiring line and has a curved shape. The curve may be any type of curve as long as it has no corner. In other words, the boundary 1112U of the coupling portion 1112 has an arc shape. The arc of the boundary 1112U of the coupling portion 1112, for example, is an elliptic arc coinciding with a part of an ellipse. The boundary 1121D also has an arc shape.

Similarly, because the linear portion 1121 and the coupling portion 1122 are continuously formed and made of a single electric conductor, a boundary 1121U of the linear portion 1121 is continuous with a boundary 1122U of the coupling portion 1122. A boundary 1122H of the coupling portion 1122 is continuous with the boundary 1121D of the linear portion 1121. The boundary 1122U of the coupling portion 1122 has a curved shape. The curve may be any type of curve as long as it has no corner.

Assuming that one of the wiring lines 100 in the display device according to the second embodiment is the first wiring line, the first wiring line, for example, has the linear portion 1101 and the coupling portion 1102. The second wiring line adjacent to the first wiring line has the linear portion 1111 and the coupling portion 1112. The boundary 1102U of the coupling portion 1102 of the first wiring line faces the second wiring line and has a curved shape. This structure has no corner at the boundary 1102U, thereby suppressing transmission of static electricity between the first wiring line and the second wiring line.

As illustrated in FIGS. 10 and 11, between adjacent wiring lines, a slit SLP without electric conductor provides electrical insulation between the linear portions 1101 and 1111 and between the coupling portions 1102 and 1112. The width of the slit SLP is constant between the linear portions 1101 and 1111 and between the coupling portions 1102 and 1112.

The boundary 1102U of the coupling portion 1102 has an arc shape, and the boundary 1112D of the second wiring line facing the boundary 1102U of the coupling portion 1102 also has an arc shape. With the slit SLP that insulates the first wiring line from the second wiring line, a part of the boundary 1112D of the second wiring line also has a curved shape. This structure further suppresses transmission of static electricity between the first wiring line and the second wiring line.

Assuming that one of the wiring lines 100 in the display device according to the second embodiment is the first wiring line, the first wiring line, for example, has the linear portion 1111 and the coupling portion 1112. The second wiring line adjacent to the first wiring line has the linear portion 1121 and the coupling portion 1122. The boundary 1112U of the coupling portion 1112 of the first wiring line faces the second wiring line and has a curved shape. This structure has no corner at the boundary 1112U, thereby suppressing transmission of static electricity between the first wiring line and the second wiring line.

As illustrated in FIGS. 10 and 11, between adjacent wiring lines, a slit SLQ without electric conductor provides electrical insulation between the linear portions 1111 and 1121 and between the coupling portions 1112 and 1122. The width of the slit SLQ is constant between the linear portions 1111 and 1121 and between the coupling portions 1112 and 1122.

The boundary 1112U of the coupling portion 1112 has an arc shape, and the boundary 1121D of the second wiring line facing the boundary 1112U of the coupling portion 1112 also has an arc shape. With the slit SLQ that insulates the first wiring line from the second wiring line, a part of the boundary 1121D of the second wiring line also has a curved shape. This structure further suppresses transmission of static electricity between the first wiring line and the second wiring line.

Third Embodiment

Figure 12:
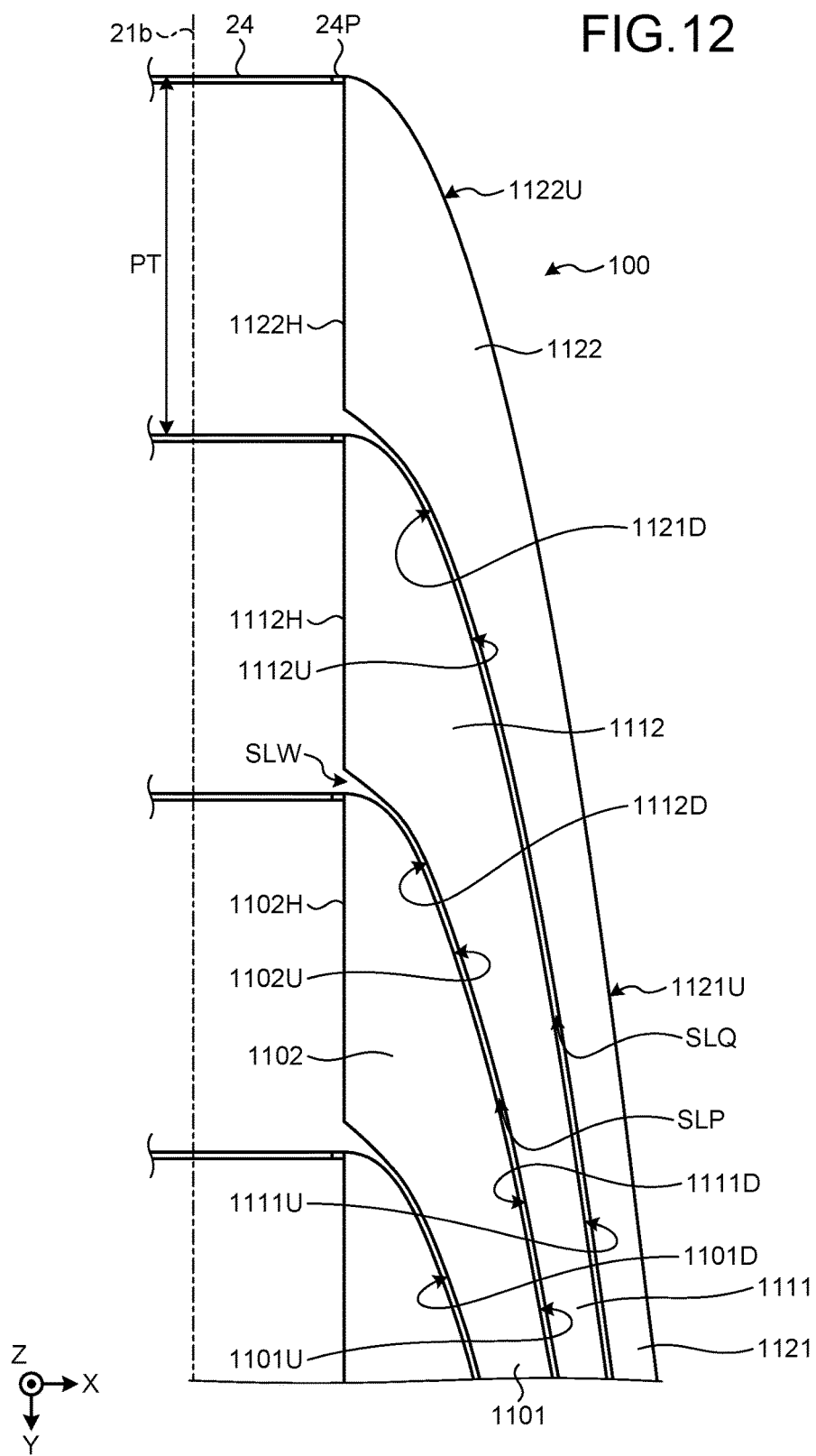
FIG. 12 is yet another enlarged schematic of a part of the wiring lines illustrated in FIG. 6 arranged closer to the scanning lines.

FIG. 12 is an enlarged schematic of a part of the wiring lines illustrated in FIG. 6 arranged closer to the scanning lines. Components identical with those described in the first and the second embodiments are denoted by like reference numerals, and overlapping explanation thereof will be omitted.

The wiring lines illustrated in FIG. 9 of the display device according to a third embodiment of the present invention are arranged in the area 30C illustrated in FIG. 6. The wiring lines illustrated in FIG. 8 are arranged in the area 30D illustrated in FIG. 6. The wiring lines illustrated in FIG. 10 are arranged in the area 30E illustrated in FIG. 6. The wiring lines illustrated in FIG. 11 are arranged in the area 30A illustrated in FIG. 12. Because the areas 30B, 30C, and 30D have the wiring lines similar to those according to the second embodiment, detailed explanation thereof will be omitted.

As illustrated in FIG. 12, between adjacent wiring lines, the slit SLP without electric conductor provides electrical insulation between the linear portions 1101 and 1111 and between the coupling portions 1102 and 1112. The slit SLP has a slit widened portion SLW having a larger width on the side closer to the second side 21b than the width between the linear portions 1101 and 1111. As described above, the boundary 1102U of the coupling portion 1102 has an arc shape. The boundary 1112D also has an arc shape.

The slit widened portion SLW increases the distance between the boundary 1102H of the coupling portion 1102 and the boundary 1112H of the coupling portion 1112, thereby further suppressing transmission of static electricity between the first wiring line and the second wiring line.

While exemplary embodiments of the present invention have been described, they are not intended to limit the present invention. The contents disclosed by the embodiments are given by way of example only, and various changes may be made without departing from the spirit of the invention. Appropriate changes made without departing from the spirit of the invention are naturally included in the technical scope of the invention.

While the display device 1 according to the embodiments above is a liquid-crystal display device, for example, the present invention is also applicable to a display device that causes a self-luminous body, such as an organic light-emitting diode (OLED), to emit light. The scanning line drive circuit 22 illustrated in FIG. 5 may be provided in plurality. The wiring lines 100 illustrated in FIG. 5 may be provided not on the outside of the second side 21b of the display area 21 but on the outside of the fourth side 21d. Alternatively, the wiring lines 100 illustrated in FIG. 5 may be provided not only on the outside of the second side 21b of the display area 21 but also on the outside of the fourth side 21d. The components according to the embodiments above can be appropriately combined.

The present invention can naturally provide other advantageous effects that are provided by the aspects described in the embodiments above and are clearly defined by the description in the present specification or appropriately conceivable by those skilled in the art.

What is claimed is:

1. A display device comprising:
a display area having a rectangular shape and including a plurality of pixels arranged in a matrix on a substrate;
a plurality of scanning lines extending along respective rows in which the pixels are arranged;
a scanning line drive circuit that sequentially supplies a scanning signal to the scanning lines; and
a plurality of wiring lines that electrically couple the scanning line drive circuit arranged outside a first side of the display area to the scanning lines, wherein
the wiring lines are arranged outside a second side orthogonal to the first side of the display area,
a first wiring line and a second wiring line adjacent to the first wiring line out of the wiring lines each include a linear portion that linearly extends in a direction away from the scanning line drive circuit and a coupling portion that is formed continuously with the linear portion, that curves to the second side of the display area from the direction in which the linear portion extends, and that has a larger width than a width of the linear portion as the coupling portion becomes closer to the second side of the display area,
a boundary of the coupling portion of the first wiring line facing the second wiring line and a boundary of the second wiring line facing the coupling portion of the first wiring line each have an arc shape formed by a curve without a corner, and
a slit that insulates the second wiring line from the first wiring line has a constant width.

2. The display device according to claim 1, wherein
a third wiring line out of the wiring lines includes a linear portion linearly extending in the direction away from the scanning line drive circuit, and the linear portion of the third wiring line is directly coupled to a respective scanning line, and
each time the linear portion of the third wiring line is coupled to one of the scanning lines, the number of the linear portions having a larger width is increased from the furthest side from the second side of the display area.

3. The display device according to claim 1, wherein the boundary of the coupling portion of the first wiring line facing the second wiring line and the boundary of the second wiring line facing the coupling portion of the first wiring line each have a shape of an elliptic arc coinciding with a part of an ellipse.

\* \* \* \* \*